United States Patent
Vampola et al.

(10) Patent No.: US 9,029,770 B2
(45) Date of Patent: May 12, 2015

(54) ENHANCED DIRECT INJECTION CIRCUIT

(75) Inventors: John L. Vampola, Santa Barbara, CA (US); Andrew E. Gin, Santa Barbara, CA (US); Roya Mokhtari, Santa Barbara, CA (US); Walter C. Trautfield, Lompoc, CA (US)

(73) Assignee: Raytheon Company, Waltham, MA (US)

( * ) Notice: Subject to any disclaimer, the term of this patent is extended or adjusted under 35 U.S.C. 154(b) by 1366 days.

(21) Appl. No.: 12/688,457

(22) Filed: Jan. 15, 2010

(65) Prior Publication Data
US 2010/0288927 A1 Nov. 18, 2010

Related U.S. Application Data

(60) Provisional application No. 61/145,401, filed on Jan. 16, 2009.

(51) Int. Cl.
| | | |
|---|---|---|
| H01L 27/14 | (2006.01) | |
| H01L 31/00 | (2006.01) | |
| G01J 1/16 | (2006.01) | |
| H04N 5/33 | (2006.01) | |
| H04N 3/14 | (2006.01) | |
| H04N 5/357 | (2011.01) | |
| H04N 5/378 | (2011.01) | |

(52) U.S. Cl.
CPC .............. *H04N 5/33* (2013.01); *H04N 3/1568* (2013.01); *H04N 5/357* (2013.01); *H04N 5/378* (2013.01)

(58) Field of Classification Search
USPC .................................. 250/336.1, 338.1, 338.4
See application file for complete search history.

(56) References Cited

U.S. PATENT DOCUMENTS

| | | | |
|---|---|---|---|
| 4,554,571 A | 11/1985 | Arques | |
| 4,590,390 A | 5/1986 | Arques | |
| 5,008,544 A | 4/1991 | Nicholas | |
| 5,093,589 A | 3/1992 | Miyamoto et al. | |
| 2004/0169752 A1* | 9/2004 | Stark | 348/302 |

OTHER PUBLICATIONS

PCT Notification of Transmittal of the International Search Report and the Written Opinion of the International Searching Authority, or the Declaration, PCT/US2010/021391, 15 pages, May 3, 2010.
Hewitt, et al., "Infrared Readout Electronics: a Historical Perspective", Proceedings of the SPIE, vol. 2226, Jan. 1, 1994; pp. 108-119.

* cited by examiner

*Primary Examiner* — David Porta
*Assistant Examiner* — Carolyn Igyarto
(74) *Attorney, Agent, or Firm* — Lando & Anastasi, LLP

(57) ABSTRACT

A charge injection circuit is used to control injection of an electronic charge to be added to a photon-induced charge generated by a detector of a direct integration circuit. The electronic charge can be injected directly to the detector or through a parallel path to the detector. Injection of the electronic charge is controlled through one or more switching transistors

15 Claims, 2 Drawing Sheets

ENHANCED DIRECT INJECTION CIRCUIT

CROSS REFERENCE TO RELATED APPLICATIONS

This application claims the benefit of U.S. Provisional Application No. 61/145,401 entitled ENHANCED DIRECT INJECTION INPUT CIRCUIT FILED JAN. 16, 2009, WHICH IS HEREBY INCORPORATED HEREIN BY REFERENCE.

TECHNICAL FIELD OF THE DISCLOSURE

This disclosure generally relates to circuits for detector applications and more particularly to an enhanced direct injection circuit.

BACKGROUND OF THE DISCLOSURE

There are few circuit choices for detector applications involving low background in the infrared spectra. These current circuit choices generally have limited dynamic range, are nonlinear, require a large amount of real estate, and consume large amounts of power. Specific circuit choices for detector applications include direct integration circuits, capacitor transimpedance amplifiers (CTIAs), the use of a source follower per detector (SFD), and resistor load amplifiers. Direct integration circuits prevent linear responses, have low bandwidth, and have limitations at low background. Capacitor transimpedance amplifiers (CTIAs) require high power and significant real estate. Using a source follower per detector (SFD) provides a limited dynamic range for infrared detectors. Finally, resistor load amplifiers require a noisy high impedance resistor and well-matched MOSFETs, both of which have proven to be noisy and non-uniform.

SUMMARY OF THE DISCLOSURE

From the foregoing, it may be appreciated by those skilled in the art that a need has arisen for a circuit for detector applications that can eliminate the various disadvantages typical of the circuits currently available. In accordance with embodiments of the disclosure, an enhanced direct injection circuit is provided that substantially eliminates or greatly reduces disadvantages and problems associated with the currently available circuits for detector applications.

According to one embodiment, a method of operating an enhanced direct injection circuit for detector applications comprises adding an electronic charge in parallel to a photon-induced charge of a direct injection circuit, wherein the direct injection circuit comprises a common gate amplifier.

A potential technical advantage of some embodiments of the invention is the ability to provide a circuit that is very compact, has low power consumption, has a wide dynamic range at low infrared light levels, and generates a linear response.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Figure 1:
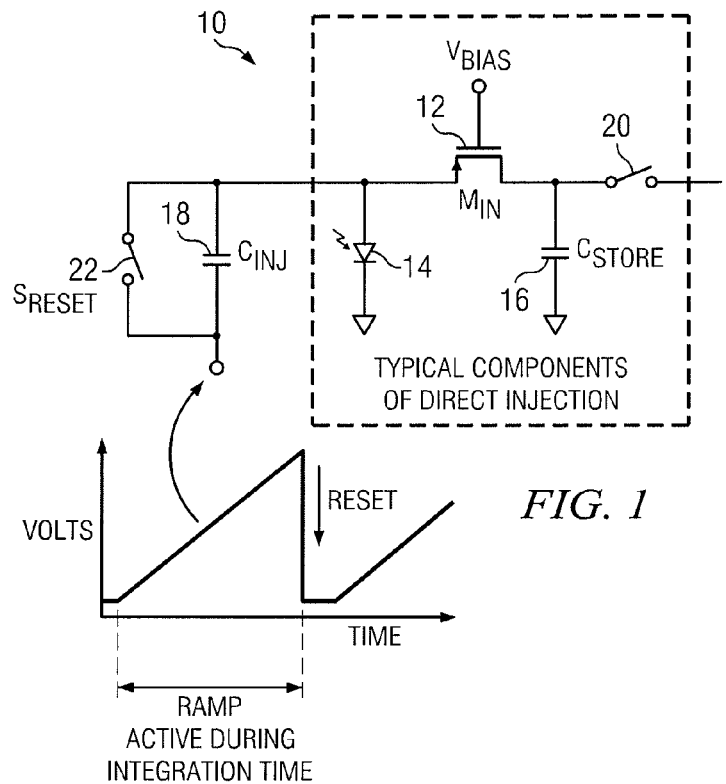
FIG. 1 illustrates an example of an enhanced direct injection input circuit.

FIG. 1 illustrates one example of an enhanced direct injection circuit 10. The enhanced direct injection circuit 10 utilizes a common gate amplifier similar to that used in direct integration circuits. The enhanced direct injection circuit 10 adds an electronic charge, either as a pulse, constant current, or pulse-shaped current, to the photon-induced charge. The additional charge forces an injection transistor 12 of the common gate amplifier of the enhanced direct injection circuit 10 to provide a low impedance to the photon-induced charge. The additional charge also keeps the injection transistor 12 biased at the end of the integration and allows for near 100% transfer efficiency and high bandwidth.

The enhanced direct injection circuit 10 in FIG. 1 features a detector 14, a first capacitor 16, and a second capacitor 18. The detector 14 may be a photodiode or any other device operable to absorb light. Additionally, the enhanced direct injection circuit 10 features the injection transistor 12 in series with each of the detector 14, first capacitor 16, and second capacitor 18. The injection transistor 12 may be any device operable to amplify or switch electronic signals. A voltage bias is applied to the injection transistor 12 to set an appropriate operating point. A reset switch 20 is also included to periodically reset the enhanced direct injection circuit 10.

A metered or pulse-shaped packet of charge is injected with the photon-induced charge. The magnitude of the voltage supplied over time is illustrated in FIG. 1. The voltage supplied increases linearly with relation to time until the reset switch 20 is applied. After the reset switch 20 is applied, the voltage supplied returns to its original value before increasing linearly again. The additional charge forces the injection transistor 12 of the enhanced direct injection circuit 10 to provide a low impedance to the photon-induced charge.

Figure 2:
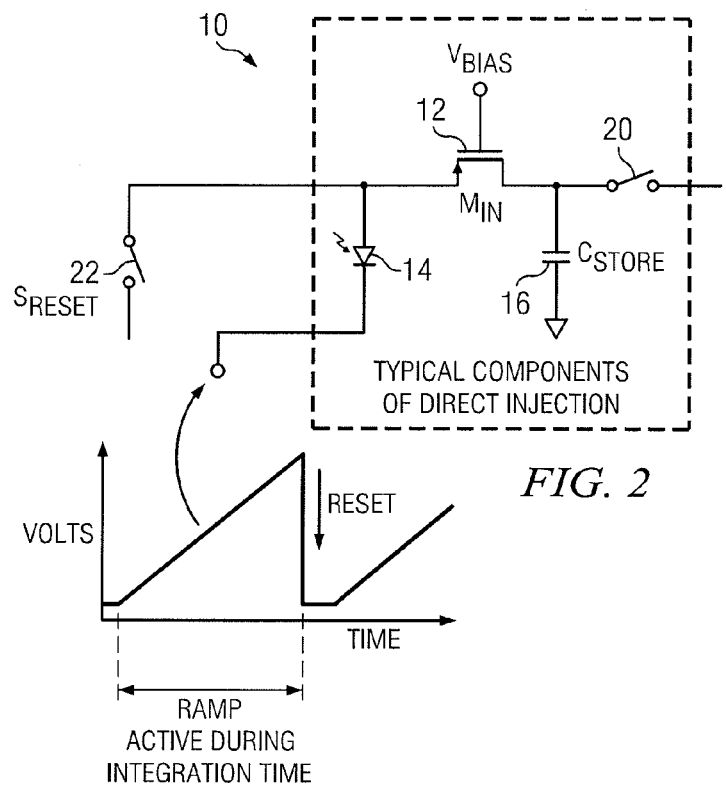
FIG. 2 illustrates another example of an enhanced direct injection input circuit.
Figure 3:
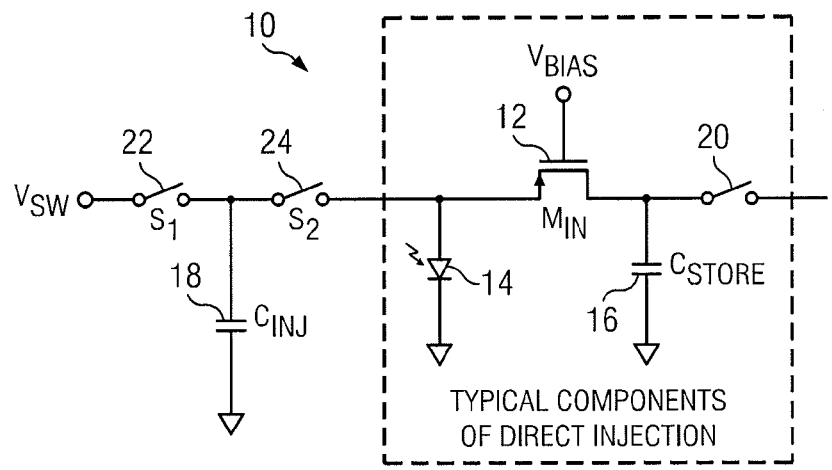
FIG. 3 illustrates another example of an enhanced direct injection input circuit.
Figure 4:
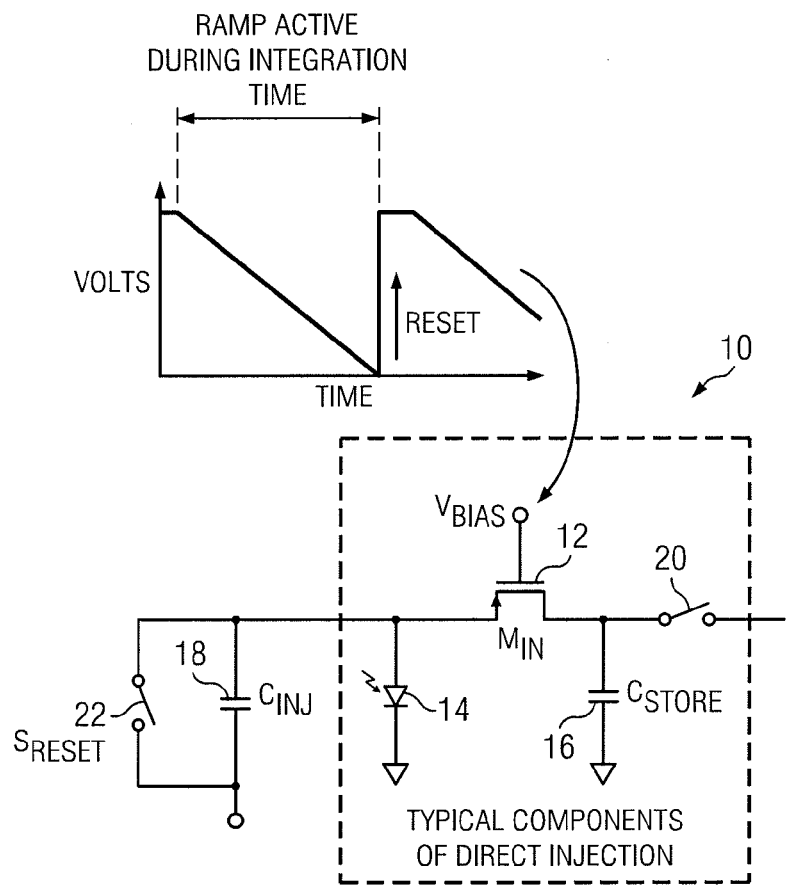
FIG. 4 illustrates another example of an enhanced direct injection input circuit.

The charge may be applied in numerous ways. In FIG. 1, the charge is injected through a parallel path using a switching transistor 22 and the second capacitor 18 to the detector 14 through manipulation of the injection gate. In FIG. 2, the charge is injected directly through the detector 14 using the switching transistor 22. In FIG. 3, the charge is injected directly through the detector 14 using two switching transistors 22 and 24 and the second capacitor 18. FIG. 4 illustrates yet another way, similar to FIG. 1 but with an inverse bias, of applying the charge through the parallel path to the detector 14 through manipulation of the injection gate. Other techniques known to those skilled in the art for injecting the charge onto the detector 14 may be used as well. The enhanced direct injection circuit 10 replaces the conventional concept that used an input current source, that had noise and uniformity deficiencies, with a metered or pulse shaped packet of charge that is very uniform and well controlled.

From the foregoing, it may be appreciated by those skilled in the art that a potential technical advantage of some embodiments of the invention is the ability to provide a circuit that is very compact, has low power consumption, has a wide dynamic range at low infrared light levels, and generates a linear response.

Although the present disclosure and its advantages have been described in detail, it should be understood that various changes, substitutions, and alterations can be made therein without departing from the spirit and scope of the disclosure as defined by the appended claims.

What is claimed is:

1. A method of operating a circuit for detector applications, comprising:
   supplying a voltage to a charge injection circuit including a capacitor;
   injecting a pulse of electronic charge through the capacitor to a photon-induced charge generated by a detector of a direct injection circuit,
   wherein the voltage supplied to the charge injection circuit increases linearly from an initial value over an integration time of the direct injection circuit.

2. The. method of claim 1, wherein injecting the pulse of electronic charge includes injecting the pulse of electronic charge through a parallel path to the photon-induced charge.

3. The method of claim 1, wherein injecting the pulse of electronic charge includes injecting the pulse of electronic charge through the capacitor directly to the photon-induced charge.

4. The method of claim 1, further comprising:
   periodically resetting the voltage supplied to the charge injection circuit to the initial value.

5. The method of claim 1, wherein the pulse of electronic charge is injected to the photon-induced charge as a pulse shaped current.

6. The method of claim 1, wherein injecting the pulse of electronic charge includes injecting the pulse of electronic charge through the capacitor using a pair of switching transistors.

7. A circuit for infrared detection, comprising:
   a direct injection circuit operable to generate a photon-induced charge;
   a charge injection circuit including a capacitor and at least one switching transistor, the charge injection circuit operable to add a pulse of electronic charge to the photon-induced charge through the capacitor; and
   a voltage supply coupled to the charge injection circuit and configured to supply a voltage to the charge injection circuit,
   wherein the voltage supplied to the charge injection circuit increases linearly from an initial value over an integration time of the direct injection circuit.

8. The circuit of claim 7, wherein the at least one switching transistor and the capacitor are connected to provide a parallel path to add the pulse of electronic charge to the photon-induced charge.

9. The circuit of claim 8, wherein the at least one switching transistor is connected in parallel with the capacitor.

10. The circuit of claim 7, wherein the at least one switching transistor includes a first switching transistor and a second switching transistor configured to control injection of the pulse of electronic charge to the photon-induced charge.

11. The circuit of claim 10, wherein the direct injection circuit includes a detector, and wherein the second switching transistor is connected between the capacitor and the detector.

12. The circuit of claim 11, wherein the detector is a photodiode.

13. The circuit of claim 10, wherein the first and second switching transistors are connected in series.

14. The circuit of claim 7, wherein the pulse of electronic charge is a pulse shaped current.

15. The circuit of claim 7, wherein the at least one switching transistor is configured to reset the charge injection circuit after the integration time of the direct injection circuit to reset the voltage supplied to the charge injection circuit to the initial value.

* * * * *